(12) United States Patent
Poole

(10) Patent No.: US 7,230,348 B2
(45) Date of Patent: Jun. 12, 2007

(54) INFUSER AUGMENTED VERTICAL WIND TURBINE ELECTRICAL GENERATING SYSTEM

(76) Inventor: A. Bruce Poole, 6166 Leesburg Pike, Apt. D314, Falls Church, VA (US) 22044

( * ) Notice: Subject to any disclaimer, the term of this patent is extended or adjusted under 35 U.S.C. 154(b) by 54 days.

(21) Appl. No.: 11/266,187

(22) Filed: Nov. 4, 2005

(65) Prior Publication Data
US 2007/0102938 A1 May 10, 2007

(51) Int. Cl.
*F03D 3/00* (2006.01)
*F03D 9/00* (2006.01)

(52) U.S. Cl. .................. 290/55; 290/44; 415/4.2; 416/1

(58) Field of Classification Search .......... 290/43, 290/44, 54, 55; 415/4.2, 4.4; 416/1, 128
See application file for complete search history.

(56) References Cited

U.S. PATENT DOCUMENTS

| | | | | |
|---|---|---|---|---|
| 4,039,849 | A * | 8/1977 | Mater et al. ............... | 290/55 |
| 4,189,925 | A | 2/1980 | Long | |
| 4,206,608 | A | 6/1980 | Bell | |
| 4,234,289 | A * | 11/1980 | Lebost .................... | 415/4.4 |
| 4,295,783 | A * | 10/1981 | Lebost .................... | 415/4.4 |
| 4,342,539 | A * | 8/1982 | Potter ....................... | 416/9 |
| 4,359,311 | A * | 11/1982 | Benesh .................. | 416/197 A |
| 4,718,822 | A * | 1/1988 | Riezinstein ............. | 416/119 |
| 5,336,933 | A * | 8/1994 | Ernster .................... | 290/55 |
| 5,384,489 | A | 1/1995 | Bellac | |
| 5,436,508 | A | 7/1995 | Sorensen | |
| 6,172,429 | B1 * | 1/2001 | Russell .................... | 290/54 |
| 6,345,957 | B1 * | 2/2002 | Szpur .................... | 416/197 A |
| 6,808,366 | B2 * | 10/2004 | Sikes ....................... | 416/1 |
| 6,910,873 | B2 * | 6/2005 | Kaliski .................... | 418/267 |
| 7,040,859 | B2 * | 5/2006 | Kane ....................... | 415/4.2 |
| 7,094,017 | B2 * | 8/2006 | Kurita ..................... | 415/4.2 |

FOREIGN PATENT DOCUMENTS

GB 2 257 475 A * 1/1993

\* cited by examiner

*Primary Examiner*—Nicholas Ponomarenko
(74) *Attorney, Agent, or Firm*—Intellectual Property Law Firm of R. J. Lasker, Esq.

(57) ABSTRACT

A wind turbine for generating electrical power having a vertical "Savonius rotor type" wind rotatable turbine with multiple fixed pitch blades and a rotatable wind inlet duct having an identical number of multiple infuser-shaped aerodynamic guides as the pitch blades and is mounted in the duct to direct equal air flow at higher speed to load each of the multiple fixed pitch blades to form an infuser system. The wind-rotatable turbine is mounted within the inlet duct and infuser system. A synchronous generator is driven by the vertical turbine and an electrically driven hold-down spring system enables the wind turbine to disconnect from the generator when the wind speed is above maximum safe operating speeds. An automatic control system that controls electrical power to the electrically driven hold-down spring system enables the wind turbine shaft to be automatically loaded or unloaded to the generator shaft based on the incoming wind speed measurement as determined by a wind speed measuring system mounted to the rotating duct system and connected to the automatic control system.

9 Claims, 5 Drawing Sheets

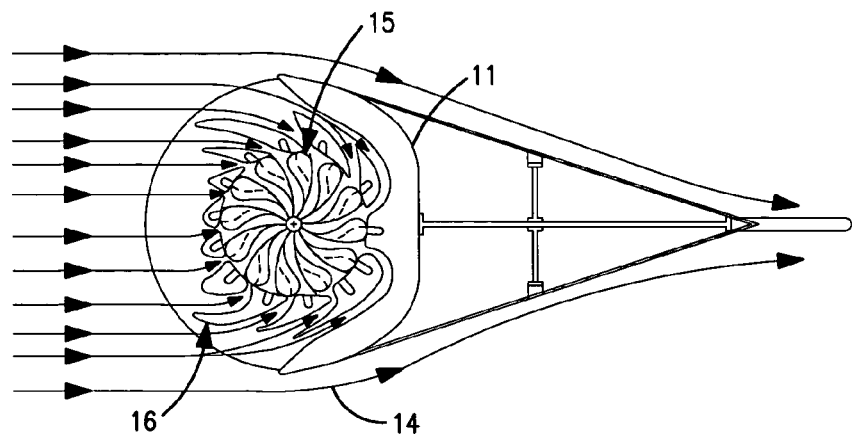
FIG. 2
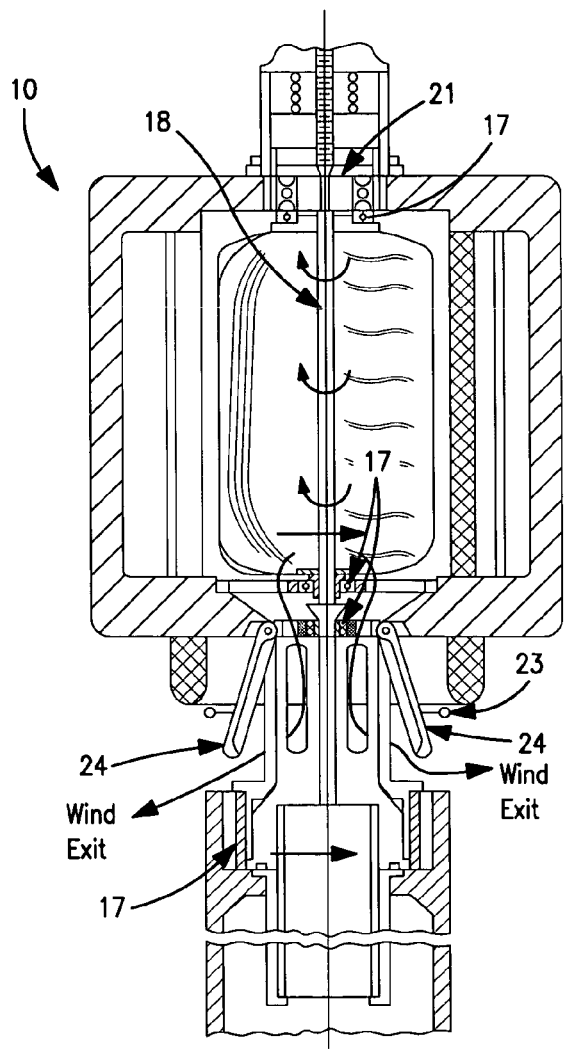
FIG. 3
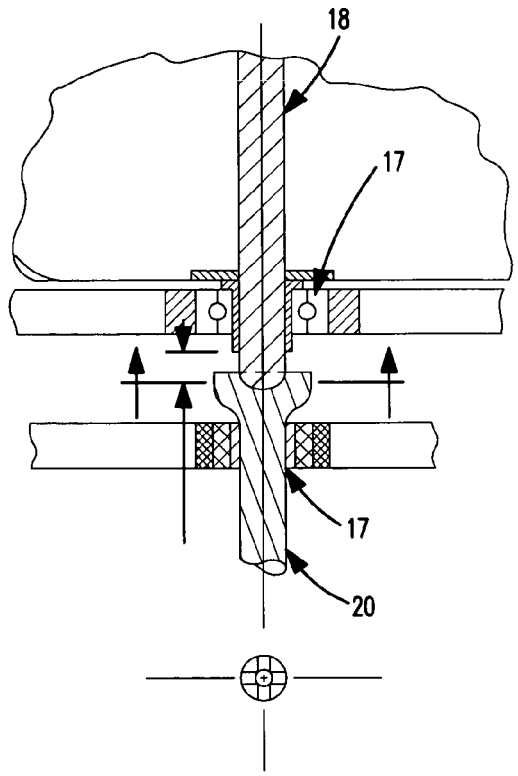
FIG. 4
FIG. 5

INFUSER AUGMENTED VERTICAL WIND TURBINE ELECTRICAL GENERATING SYSTEM

BACKGROUND OF THE INVENTION

1. Field of the Invention

This invention relates generally to a vertical, wind-driven turbine for generating electrical power, and particularly to such a power generating system having a number of rotors supporting twice the number of loading blades, and preferably six (6) "Savonius type" rotors providing twelve (12) loading blades. A specially designed unique aerodynamic infuser allows the efficiency of the turbine to be increased by loading each of the 12 blades separately with higher speed air than the free wind stream. The infuser and the vertical wind turbine are mounted in an inlet duct system attached to a vertically-supported column in such a manner that the components can rotate with changing wind direction. The aforementioned components are herein designated as a "Wind Shark" electrical generating turbine.

The simple individuality of the design of the invention allows numerous "Wind Shark" electrical generating turbines to be mounted together in a "skid/rack" system where the turbines are located on a triangular pitch. These "skid/rack" systems can be pre-assembled and delivered to a wind power site for simple installation. The stacking of one or more than one "skid/rack" can provide for the assembly of a "wind motel" facility that can provide significant multiples of electric power over that generated by one turbine.

The unique design of the "Wind Shark" infuser systems also allows compressed air to be used to generate electricity when the free stream wind is not sufficient to turn the wind turbine. The electrical generating system of the invention thus provides renewable emission-free electric power where energy can be stored in compressed air tanks as needed.

2. Description of the Prior Art

There are numerous types of windmills designed specifically for electrical power generation and most of these designs have a shaft oriented on a horizontal axis, and the rotors (large propellers) are mounted in a vertical plane located at right angles to the horizontal shaft. The lift on the propeller blades that is generated as the wind blows through the propeller causes the shaft to rotate and this turns a generator providing the electrical output. The amount of electrical power provided by a propeller driven machine is generally considered to be proportional to the diameter of the propeller. State of the art wind turbines being installed can be as large as 135 meters high and have propeller blades sweeping a 70 meter diameter circle. The horizontal generating shaft of such a device would be some 100 meters above the ground and the propeller would rotate between 11–22 rpm and generate about 1.5 MW of electricity. "Wind farms" covering many acres of ground can perhaps have 10 to 100 of these wind turbines installed. The generated electricity from each turbine device is collected in a low voltage collection system and the power is boosted using a transformer to the large high voltage transmission grid.

The most well known vertical axis-type wind turbine is the "Darrieus rotor" which comprises semi-circular airfoil sections that are attached to a vertical shaft. The only other practical vertical wind generator is a ducted wind scoop turbine in which the wind scoop directs wind flow down thru a duct that has a multi-bladed fan mounted inside. This multi-bladed fan turns on a vertical shaft and drives an electric generator.

SUMMARY OF THE INVENTION

The invention essentially comprises a wind driven electrical power generator system having a specially designed infuser with aerodynamic guides mounted in a duct inlet within which a vertical "Savonius type" turbine with six double-bladed rotors is mounted. The infuser-shaped aerodynamic guides are especially designed to provide flow paths to each rotor blade that increase the air flow speed from that of the wind stream and improves the efficiency of the "Savonius type" turbine. The turbine bases are mounted to a shaft that is perpendicular to the wind velocity and rotates clockwise due to the momentum of the wind.

The wind turbine assembly includes a connection to the rotor shaft of an electric generator arranged for converting rotary motion of the rotor into electrical energy. Wind turbine airflow exits parallel to the wind turbine shaft in the direction of the generator and can be adjusted by a segmented movable shroud mechanism. This movable shroud can be adjusted based on the incoming wind for the best efficiency of generating electricity from the generator. During very high wind conditions the turbine automatically disengages from the generator shaft and free-wheels.

Re-ingestion flow paths are arranged in the inlet diffuser guides so that compressed air can be used to spin the turbine when the conditions are weak. This compressed air is obtained from a cylindrical storage tank where it has been compressed by a compressor powered by the electrical current generated by the wind generator during normal operation, primarily at night when power needs on the electrical grid are at a minimum, but the wind conditions are sufficient to meet the power demands. This arrangement for re-ingestion of air provides the design of the present invention with the ability to provide electrical power to the grid, when needed, even if the wind is not blowing.

This wind-driven system can be used to develop "wind energy motels" that can be assembled in areas where current large horizontal axis wind machines cannot be accommodated, such as in mountain passes and on building roofs in urban areas. The "wind energy motel" design can also accommodate energy storage using compressed air methods to provide energy at time of day when it can better be utilized on the electric grid.

It is a primary object of the present invention to provide a wind-driven electrical power generating system that increases the airflow speed of the generator infuser over that of the normal wind stream and improves the efficiency of the "Savonius type" turbine.

Thus, in view of the foregoing it is a primary feature of the present invention to provide a wind-driven electrical power generator with a specially designed infuser having aerodynamic guides mounted in a duct inlet in operational relationship with a turbine and the infuser-shaped aerodynamic guides are especially designed to provide flow paths to each rotor blade of the turbine that increase the air flow speed from that of the wind stream and improves the efficiency of the turbine.

It is therefore an advantage of the wind turbine configuration of the present invention that increased flow speeds of the turbine infuser are obtained.

It is a further object of the present invention to provide a wind turbine of the type specified herein that enables compressed air to be used to spin the turbine blades when the wind conditions are weak to meet the output demand of the wind turbine.

To accomplish the above object the present invention utilizes re-ingestion flow paths arranged in the diffuser guides so that compressed air can spin the turbine blades when the wind conditions are weak.

Thus a further advantage of the turbine of the present invention enables the generation of electrical power during weak wind conditions.

And yet a further object of the present invention is to provide wind-driven systems comprising an assembly of individual wind turbines that can be assembled in areas where large horizontal axis wind turbines cannot be accommodated such as in mountain passes and on the roofs of buildings in urban areas.

The above object is accomplished by arranging individual wind turbines of the invention in a "skid/rack" alignment wherein the individual turbines are stacked vertically in columns and horizontally in rows and interconnected to the electrical grid.

It is thus an advantage that the "skid/rack" system of the present invention can be used in areas in which other state-of-the-art turbines can not be used because of their great size.

BRIEF DESCRIPTION OF THE FIGURES

The above objects, features and advantages of the invention are readily apparent from the following description of at least one preferred embodiment of the best mode for carrying out the invention when taken in conjunction with the following drawings, wherein:

FIG. 2 is a detail view of the infuser comprising twelve infuser blades for directing airflow into each blade of the vertical wind rotor of FIG. 1 and taken along lines 2—2 of FIG. 1 and which is shown in more detail in FIG. 6;

FIG. 3 is a view of the infuser-augmented wind turbine taken along lines 3—3 of FIG. 1 and illustrating the wind exit slots and the flow, vanes for opening or closing the wind exit area, thereby enabling the generator rotational speed to be held near a constant value to improve the voltage and current production;

FIG. 4 shows the top portion of the generator shaft and the spring-hold-down mechanism allowing the wind turbine to lift up and spin on thrust bearings at the top of the inlet duct system and when the wind speeds reduce the turbine rotor shaft slides down into a keyed top portion of the generator shaft as shown in the figure to again rotate the generator;

FIG. 5 shows a more detailed view of the infuser blades and the rotor blades with bent upper and lower edges enabling wind pressure to lift and lower the turbine vertically and the infuser blades which direct airflow into each of the turbine blades;

DETAILED DESCRIPTION

Figure 1:
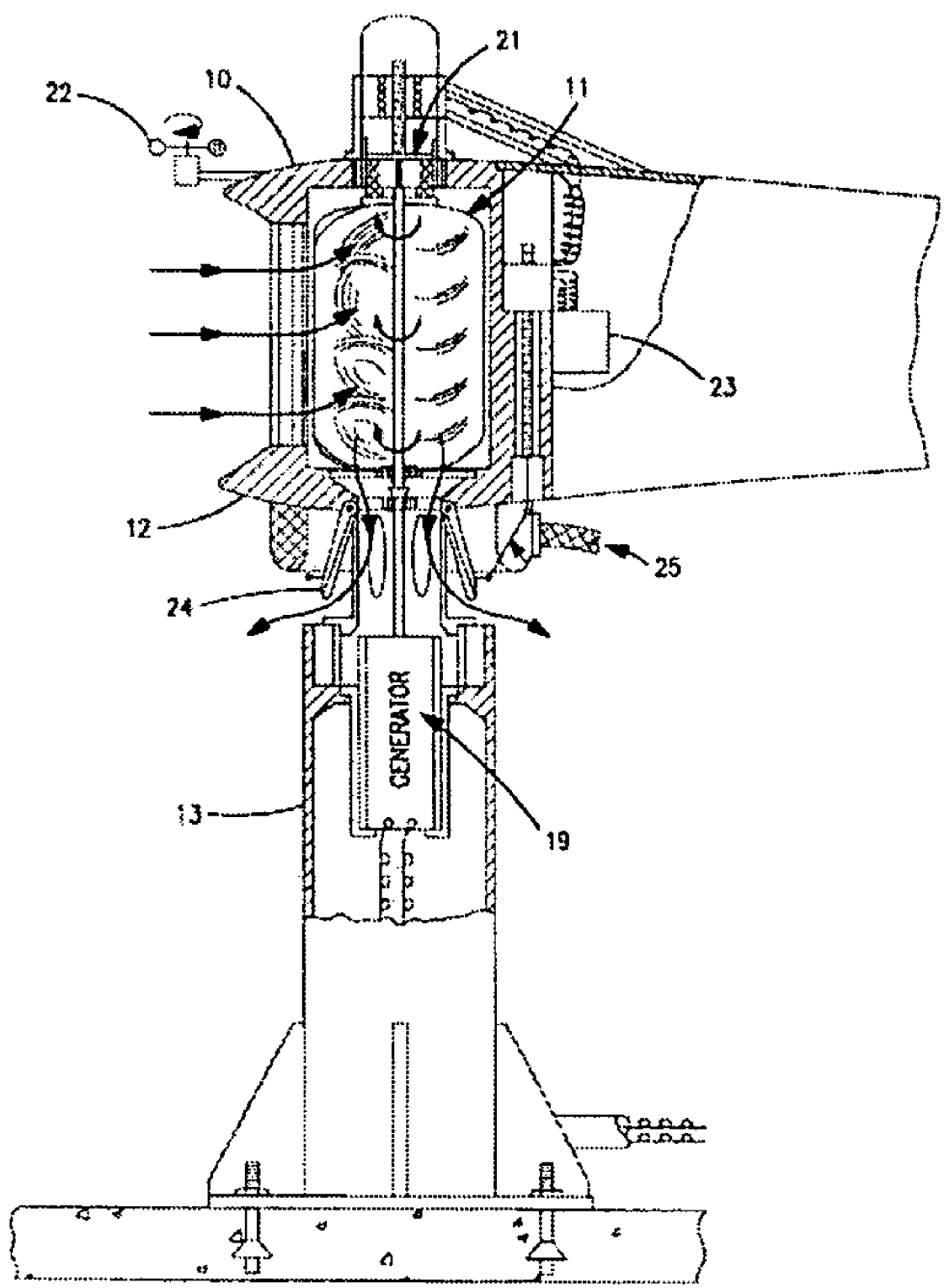
FIG. 1. illustrates a cut-away view of an infuser-augmented wind turbine with a vertical wind rotor having twelve (12) blades and supported by a duct system rotatable relative to the support column of the infuser-augmented wind turbine.

The infuser-augmented wind turbine 10 includes a vertical wind rotor 11 with twelve rotor blades (see FIGS. 2 and 6) supported in a duct system 12 which is adapted to rotate relative to column 13 for supporting the wind turbine. The inlet duct system 12 is mounted to the column support 13 so as to be self-cocking into the direction of the wind. Spring-hold-down mechanism 21 mounted within the infuser-augmented wind turbine 10 allows the turbine to lift up and spin on thrust bearing (FIG. 4) at the top of the inlet duct system 12. A speed measurement device 22 is mounted to inlet duct system 12 and provides an electronic signal to an internal mechanism 23 which moves the exit duct flow vanes 24.

Figures 6, 7:
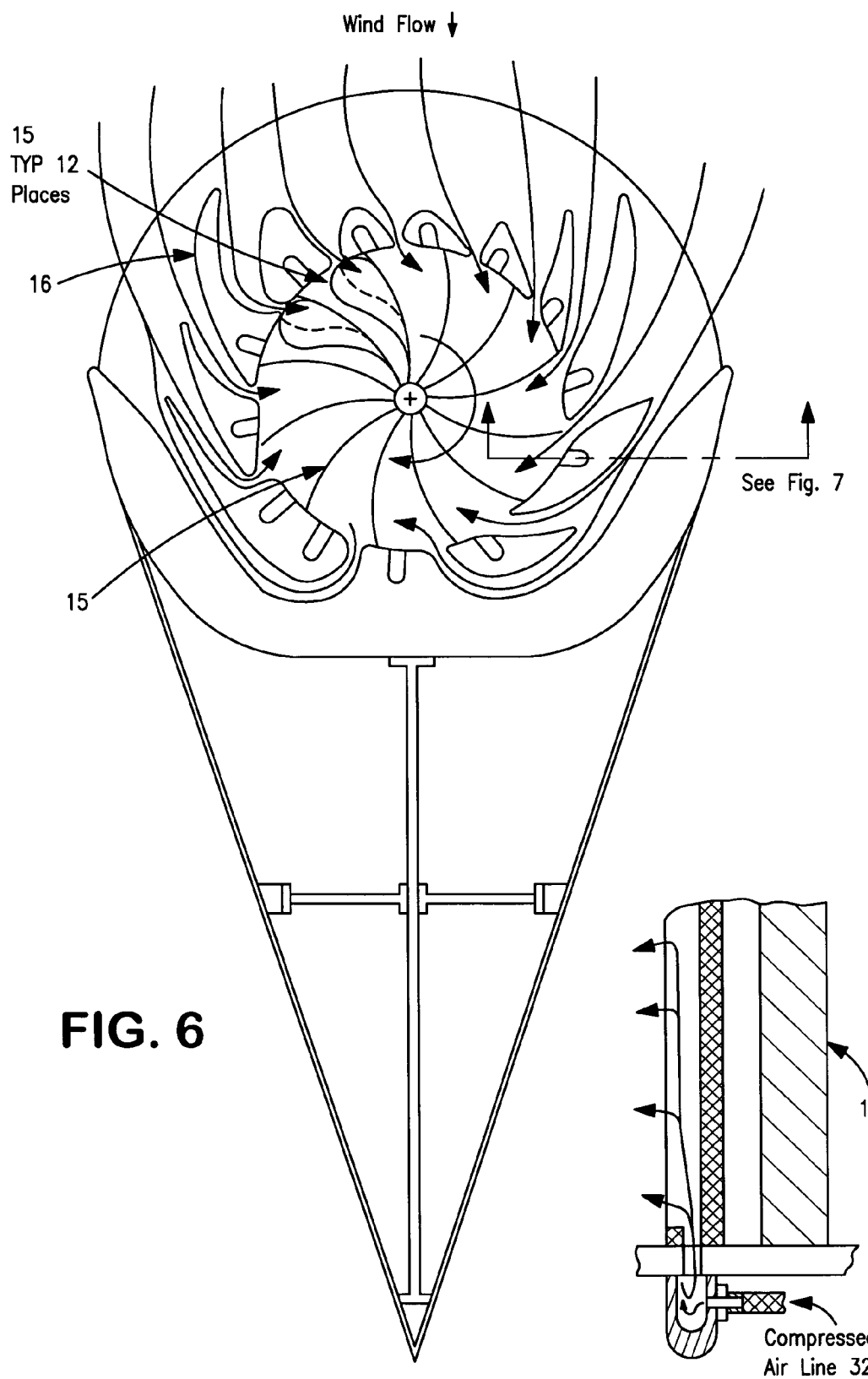
FIG. 6 is an enlarged detail view of the infuser shown in FIG. 2.
FIG. 7 is a cross-section view taken along lines 7—7 of FIG. 6 and showing the compressed air inlet flow slots located in each of the infuser blades and the compressed air line which is connected to a "Wind Shark" (not shown)

The detailed views of the infuser 14 illustrated in FIGS. 2 and 6 show the infuser, which is composed of twelve infuser blades 16 which direct the airflow into each blade of the vertical wind rotor 11. The inflow of wind into each turbine blade 15 is sped up and directed to provide the precise loading to maximize the rotation of the turbine rotor 11.

A compressed air inlet 35 is provided to inject compressed air into the inlet duct system 12 to rotate the turbine blade 15 when the wind conditions are too low to generate electricity. This operation is described more fully with respect to FIGS. 7 and 9.

As shown more clearly in FIG. 6, rotor blade 15 has bent upper and lower edges. The top edge of the rotor blade 15 is bent twice as much as the lower edge thereby allowing the wind pressure to lift the total turbine vertically. The lower section of the rotor blade is not bent as much so that wind can flow downwardly and out through the wind exit slots shown in FIGS. 1 and 3.

With reference to FIG. 3, a spring hold-down mechanism 21 allows the turbine generator 10 to lift up and spin on the thrust bearing 17 at the top of the inlet duct system (as is more clearly shown in FIG. 4). When the wind speeds reduce, the turbine rotor shaft 18 slides down into the keyed top of the generator 20, as shown more clearly in FIG. 4, and again turns the turbine generator 10. The wind speed measurement device 22 (FIG. 1) provides an electrical signal to an internal mechanism 23 which moves the exit duct flow vanes 24. The motion of the flow vanes 24 opens or closes the wind exit area and allows the turbine generator rotational speed to be held near a constant value to improve the voltage and current production.

Figure 8:
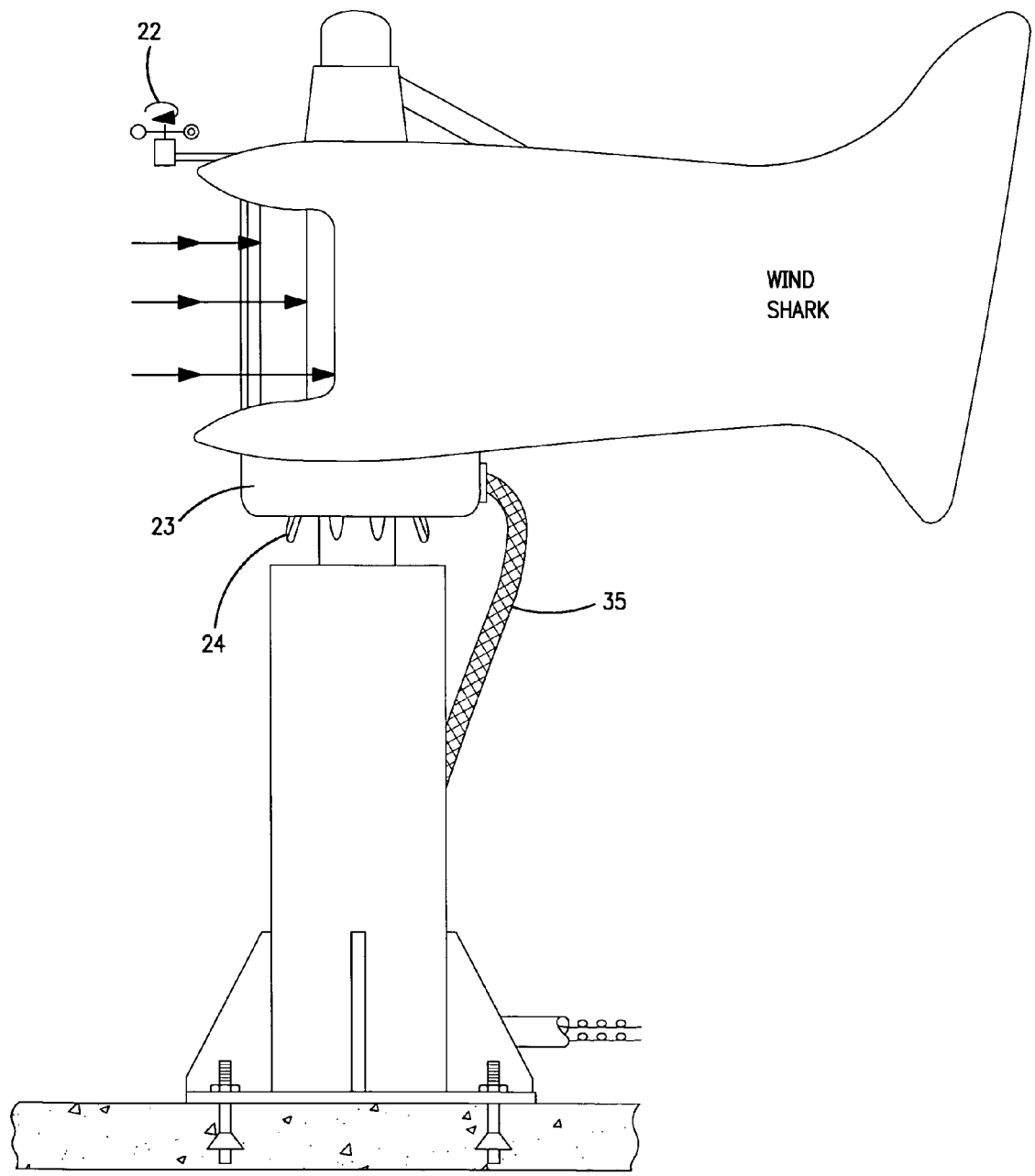
FIG. 8 illustrates an embodiment of the infuser-augmented wind turbine in the form of a "Wind Shark" showing the air inlet and the connection for the introduction of compressed air to the wind turbine.

The side view of a "Wind Shark" is illustrated in FIG. 8 and which illustrates the measurement device 22, internal mechanism 22 for moving the exit duct flow vanes as disclosed previously and compressed air inlet 35 for conducting compressed air to the infuser blades (not shown) of the generator 19 (not shown) mounted within support column 13 (FIG. 1). The "Wind Shark" essentially comprises all of the components previously described with respect to FIGS. 1–7, but constructed in a size enabling it to be used in those instances not permitting a large wind generator of the type used in those areas where large spaces are available to construct wind generator "farms".

The electrical energy produced by generator 19 (FIG. 1) can be supplied to a collector system and provided to an electrical transmission grid as is known to those skilled in the electrical power transmission art. At certain times, such as nighttime the wind may be strong but the power demand on the electrical transmission grid is small because there is a very limited electrical load. During such times the "Wind Shark" of the present invention can generate electricity and use this electrical output to drive an electric motor.

One of the advantageous features of the present invention is to store compressed air during normal operation of the infuser-augmented wind turbine and to utilize that stored compressed air to drive the generator of the "Wind Shark" during those times when the wind is insufficient to generate electrical power from the "Wind Shark".

Figure 9:
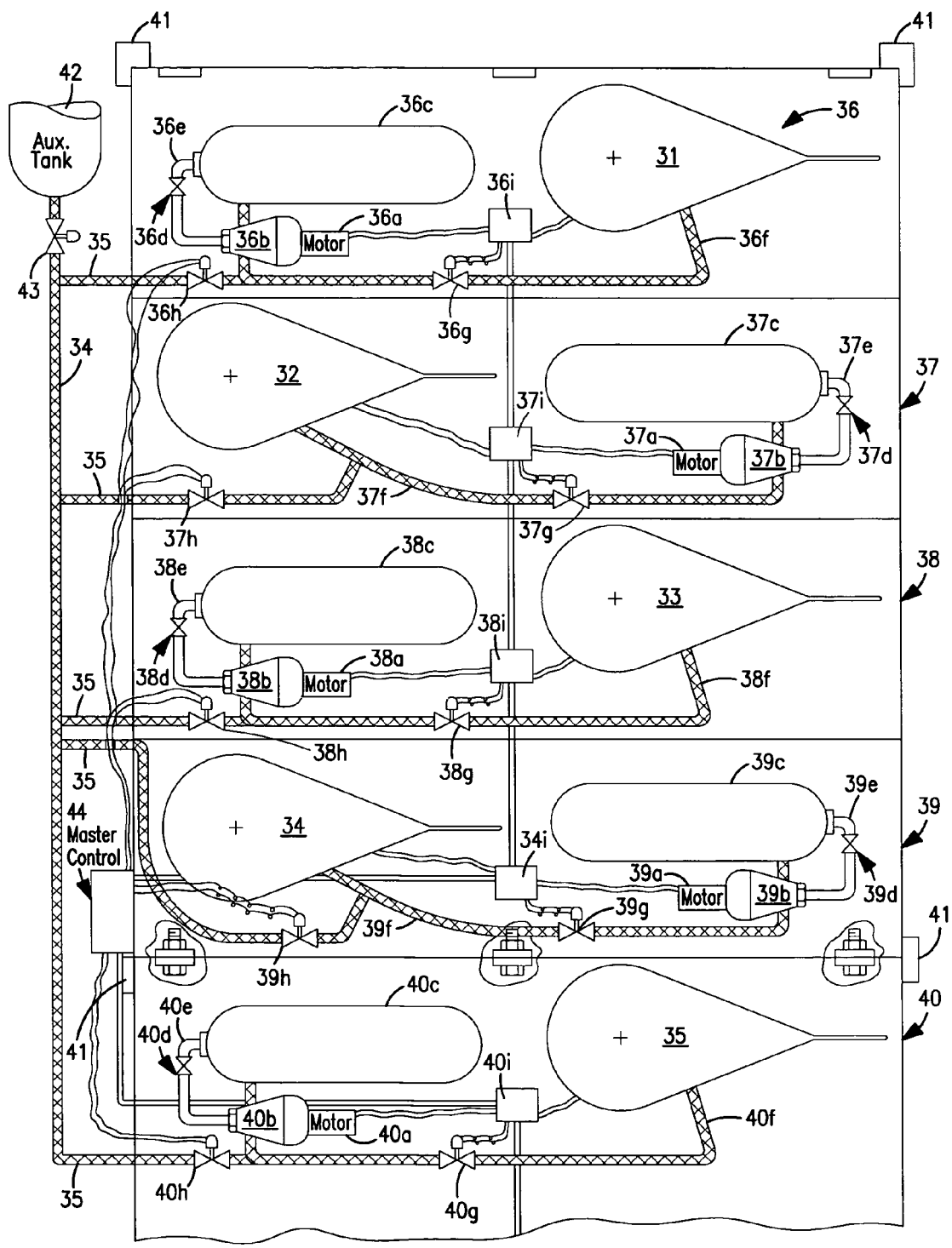
FIG. 9 shows a system of "Wind Sharks" and their associated compressed air tanks, motor, valves, controls and piping mounted on respective skids.

FIG. 9 shows a rack 41 of "Wind Shark" infuser-augmented wind turbines 31–35 and associated auxiliary components (to be described below) arranged in a Skid/rack formation to form respective skids 36, 37, 38, 39 and 40, which in turn are assembled in a rack 41 as shown in FIG. 9. Thus, with reference to skid 36, at least a portion of the electrical output of Wind Shark" 31, for example, can be used to drive electric motor 36a to power air compressor 36b by air conducted through pipe 36e to be stored in compressed air storage tank 36c and retained therein by in-line check valve 36d. Air stored in compressed air storage tank 36c is released to "wind Shark" generator 31 via pipe 36f and controlled by electrically activated two-way valve 36g. Electrically controlled valves 36h and 43 can be opened to provide additional compressed air from auxiliary air tank 42 during long term operation of the "Wind Shark" generator inflow wind speed conditions. Electrically operated valves 36g can be controlled from a skid control station 36i when air is flowing either from or two "Wind Shark" generator 31. electrically controlled valve 36h is controlled from a master control station 44 on the skid/rack formation 41 when auxiliary air is supplied to "Wind Shark" generator 31.

In general a skid is composed of one "Wind Shark" generator, one compressed air tank and one air compressor driven by a single electric motor (for example with respect to skid 36, "wind Shark" generator 31, compressed air storage tank 36c, air compressor 36b and electric motor 36a) A typical skid 36 also has associated piping Similarly "Wind Sharks" 32, 33, 34 and 35 and their associated electric motors 37a, 38a, 39a and 40a; air compressors 37b, 38b, 39b and 40b; compressed air storage tanks 37c, 38c, 39c, and 40c; in-line flow check valves 37d, 38d, 39d and 40d; pipes 37e, 38e, 39e, and 40e; pipes 37f, 38f, 39f and 40f; electrically controlled valves 37g, 37h, 38g, 38h, 39g, 39h and 40g, 40h all operate in the same manner as described above with respect to "Wind Shark" 31 on skid 36.

The control system shown in FIG. 9 allows for automatic start-up and shut-off of electric motors 36a, 37a, 38a, 39a and 40a and their respective air compressors 36b, 37b, 38b, 39b and 40b. At times when electrical grid demand is low (i.e. at night) but wind speed is high, all valves will be closed and the compressors used to charge the individual compressed air tanks 36c, 37c, 38c, 39c and 40c. Pressure measurement devices at each air tank will be used to establish a filled condition in the tank and stop the electric motors and compressors. The check valves 36d, 37d, 38d, 39d and 40d will automatically close to hold the compressed air in each compressed air storage 36c, 37c, 38c, 39c and 40c. Additional compressed air storage can be used by filling auxiliary tank 42 using bottles of compressed air or a separate large compressor that is driven from an external electric supply source (i.e., the grid when prices are low).

At times when the wind is not blowing at a sufficient speed to run the "wind shark", each turbine can be driven by its specific compressed air tank 36c, 37c, 38c, 39c and 40c. When, during this type of operation, the individual tanks loose pressure, continued operation can be maintained by closing valves 36d, 37d, 38d, 39d and 40d and opening auxiliary valve 43 and electrically controlled valves 36h, 37h, 38h, 39h and 40h. The auxiliary compressed air tank 42 can then provide motive air flow to keep the wind turbines generating. By keeping a large bank of auxiliary compressed air on hand, this method allows for long term electrical generation when the wind speeds are low.

The arrangement of "Wind Sharks" 31, 32, 33, 34 and 35 and their associated components of, inter alia, air compressors, piping, valves and controls are all mounted to rack 41 as shown in FIG. 9. A skid with components arranged as skids 36–40 can be prefabricated at a factory and delivered to the wind power site ready to function. This reduces the cost of the wind power equipment, on site fabrication, delivery costs, erection costs and operational start up problems. Skid 39 having the same design and components as skid 36 can be attached directly to skid 40 with bolts and nuts as illustrated in FIG. 9. Using appropriate support columns the aforementioned skid/racks can be joined together, and held down with a system of guy wires as is known to those skilled in the wind turbine art, to form large "Wind Motels" that can accommodate many wind turbines at one site. The large acreage of current wind farms are not required. Also the lack of tall mass and propeller mechanisms do not spoil the natural vistas at the wind turbine site. It is also anticipated that the "Wind Motel" design concept of the present invention will reduce raptor and bat kill rates, since the design reduces the kill zone size and provides a building-like shape which should be better identified by both the birds and bats.

It is desired that the present invention not be limited to the embodiments specifically described, but that it include all such modifications and variations that would be obvious to those skilled in the art of wind turbines. It is my intention that the scope of my invention should be determined by any and all equivalents of the various terms and structure recited in the following annexed claims.

The invention claimed is:

1. A wind turbine for generating electrical power, comprising:
    a vertical "Savonius rotor type" wind rotatable turbine having multiple fixed pitch blades;
    a rotatable wind inlet duct having an identical number of multiple infuser-shaped aerodynamic guides as said pitch blades and mounted in the duct to direct equal air flow at higher speed to load each of said multiple fixed pitch blades and forming an infuser system;
    said wind-rotatable turbine being mounted within said inlet duct and infuser system;
    a synchronous generator driven by said vertical turbine;
    an electrically driven hold-down spring system enabling said wind turbine to disconnect from said generator when the wind speed is above maximum safe operating speeds;
    an automatic control system that controls electrical power to said electrically driven hold-down spring system enabling the wind turbine shaft to be automatically loaded or unloaded to the generator shaft based on the incoming wind speed measurement; and
    a wind speed measuring system mounted to the rotating duct system and connected to said automatic control system.

2. The wind turbine according to claim 1, further comprising movable pivot mounted airflow shutter devices attached to a lower portion of said rotatable duct infuser system to adjust the exit airflow from the wind turbine, thereby matching the phase and control frequency of the electricity output from the wind turbine; and
    a control mechanism receiving an airflow speed signal from said wind speed measuring system for moving the airflow shutters to balance the rotational speed of the wind turbine to said synchronous generator, thereby enabling the rotational speed of the synchronous generator to maintain a substantially constant value for various wind speeds to optimize the electrical output of the synchronous generator.

3. The wind turbine of claim 1, further comprising a fixed base vertical column support and said wind-rotatable turbine and said infuser system being mounted to said vertical support column by rotational bearings; and said generator being mounted inside said column support to rotate into the wind with said turbine/infuser assembly.

4. The wind turbine of claim 2, further comprising a fixed base vertical column support and said wind-rotatable turbine and said infuser system being mounted to said vertical support column by rotational bearings; and said generator being mounted inside said column support to rotate into the wind with said turbine/infuser assembly.

5. The wind turbine according to claim 3, further comprising skid/racks for mounting said electric generators and being mounted to the roof tops of buildings.

6. The wind turbine according to claim 5 wherein said skid/racks are mounted in skid/rack assemblies by mounting the wind generators in a triangular pitch arrangement to form "Wind Motel" units of four or more wind turbines.

7. The wind turbine according to claim 1, further comprising means for storing energy during operation of the wind turbine when the loads on the electrical grid are small.

8. The wind turbine according to claim 7 wherein said means for storing energy are compressed air tanks connected to the infuser system; and further comprising a pressurized piping system with control valves connecting from the compressed air tanks to the lower portion of the "wind shark"; a circular collector system for the air located below the infuser system; said pressurized piping is further connected to the collector system and compressed air is fed thru a section of drilled holes up into the infuser sections and the compressed air then ejects from each infuser section and drives a blade of the wind turbine.

9. The wind turbine according to claim 8 is operated to provide electric current when the compressed air being ejected on to the turbine blades causes the turbine to rotate and drive the electric generator.

* * * * *